(12) United States Patent
Lim et al.

(10) Patent No.: US 11,223,737 B2
(45) Date of Patent: Jan. 11, 2022

(54) MANAGING AND RECOMMENDING APPS TO IMAGE FORMING APPARATUS BASED ON APP USAGE PATTERNS DATA AND EVENT DATA

(71) Applicant: Hewlett-Packard Development Company, L.P., Spring, TX (US)

(72) Inventors: Mok Hwa Lim, Seongnam-si (KR); Hyun Sub Kil, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 16/962,625

(22) PCT Filed: Jul. 19, 2018

(86) PCT No.: PCT/KR2018/008152
§ 371 (c)(1),
(2) Date: Jul. 16, 2020

(87) PCT Pub. No.: WO2019/151589
PCT Pub. Date: Aug. 8, 2019

(65) Prior Publication Data
US 2021/0368056 A1    Nov. 25, 2021

(30) Foreign Application Priority Data

Jan. 31, 2018 (KR) .......................... 10-2018-0011811

(51) Int. Cl.
*H04N 1/00* (2006.01)
*H04L 29/08* (2006.01)

(52) U.S. Cl.
CPC ......... *H04N 1/00949* (2013.01); *H04L 67/22* (2013.01); *H04N 1/0097* (2013.01);
(Continued)

(58) Field of Classification Search
None
See application file for complete search history.

(56) References Cited

U.S. PATENT DOCUMENTS 9,573,807 B1    2/2017  Kaufman et al.
10,034,608 B1 *  7/2018  Dintenfass ............... A61B 5/00
(Continued)

FOREIGN PATENT DOCUMENTS

JP       5494869 B2      5/2014
JP     2015-153068 A     8/2015
(Continued)

*Primary Examiner* — Haris Sabah
(74) *Attorney, Agent, or Firm* — Jefferson IP Law, LLP

(57) ABSTRACT

A server and a method for managing apps based on app usage patterns are provided. The server may include a communication device, a storage, a processor, and a memory storing instructions. The processor executes the instructions to receive, from an image forming device through the communication device, usage data including usage information of apps executed in the image forming device, analyze usage patterns of the apps based on the usage data and store usage pattern data corresponding to the usage patterns in the storage, receive first data corresponding to a first event from the image forming device through the communication device, generate recommendation information related to an app performing an image forming operation corresponding to the first event based on the usage pattern data and the first data, and transmit the recommendation information to the image forming device through the communication device.

15 Claims, 16 Drawing Sheets

(52) U.S. Cl.
CPC ..... *H04N 1/00244* (2013.01); *H04N 1/00973* (2013.01); *H04N 2201/0094* (2013.01)

(56) References Cited

U.S. PATENT DOCUMENTS

| | | | |
|---|---|---|---|
| 2011/0249285 A1 | 10/2011 | Kobayashi et al. | |
| 2012/0057197 A1* | 3/2012 | Matsuda | G06F 3/1229 358/1.15 |
| 2012/0194851 A1* | 8/2012 | Srinivasmurthy K | G06Q 30/02 358/1.15 |
| 2012/0209977 A1* | 8/2012 | Nakajo | G06K 15/1803 709/223 |
| 2014/0152606 A1* | 6/2014 | Kunitake | G06F 1/1692 345/173 |
| 2014/0320892 A1 | 10/2014 | Bhatia et al. | |
| 2014/0327929 A1 | 11/2014 | Bibhu et al. | |

FOREIGN PATENT DOCUMENTS

| | | |
|---|---|---|
| JP | 2016-224899 A | 12/2016 |
| KR | 10-2005-0045740 A | 5/2005 |
| KR | 10-2014-0110614 A | 9/2014 |

\* cited by examiner

[Fig. 1]
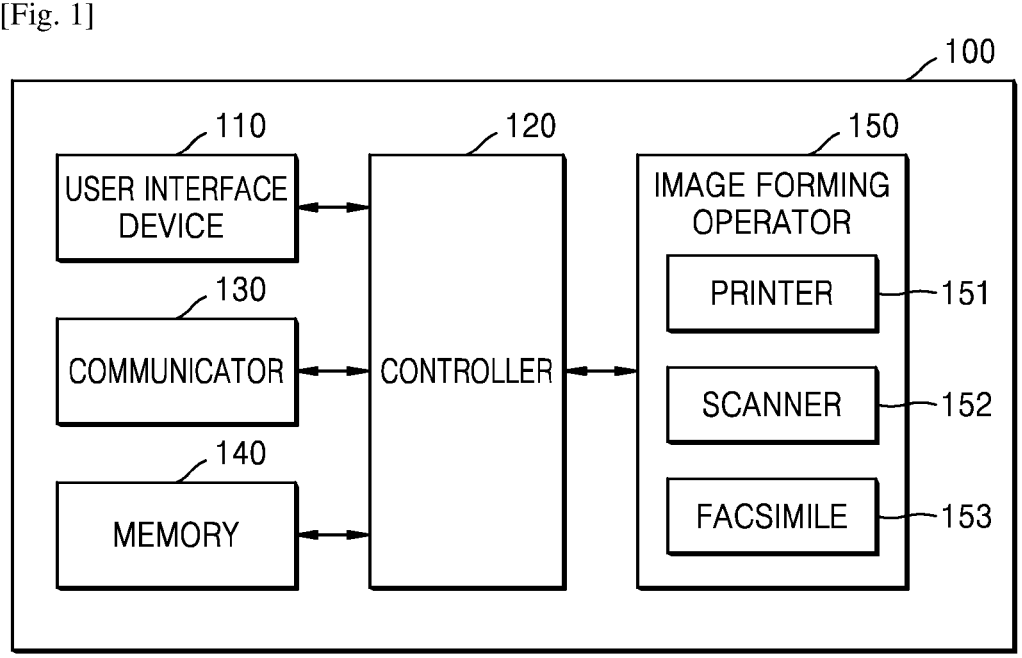

[Fig. 2]
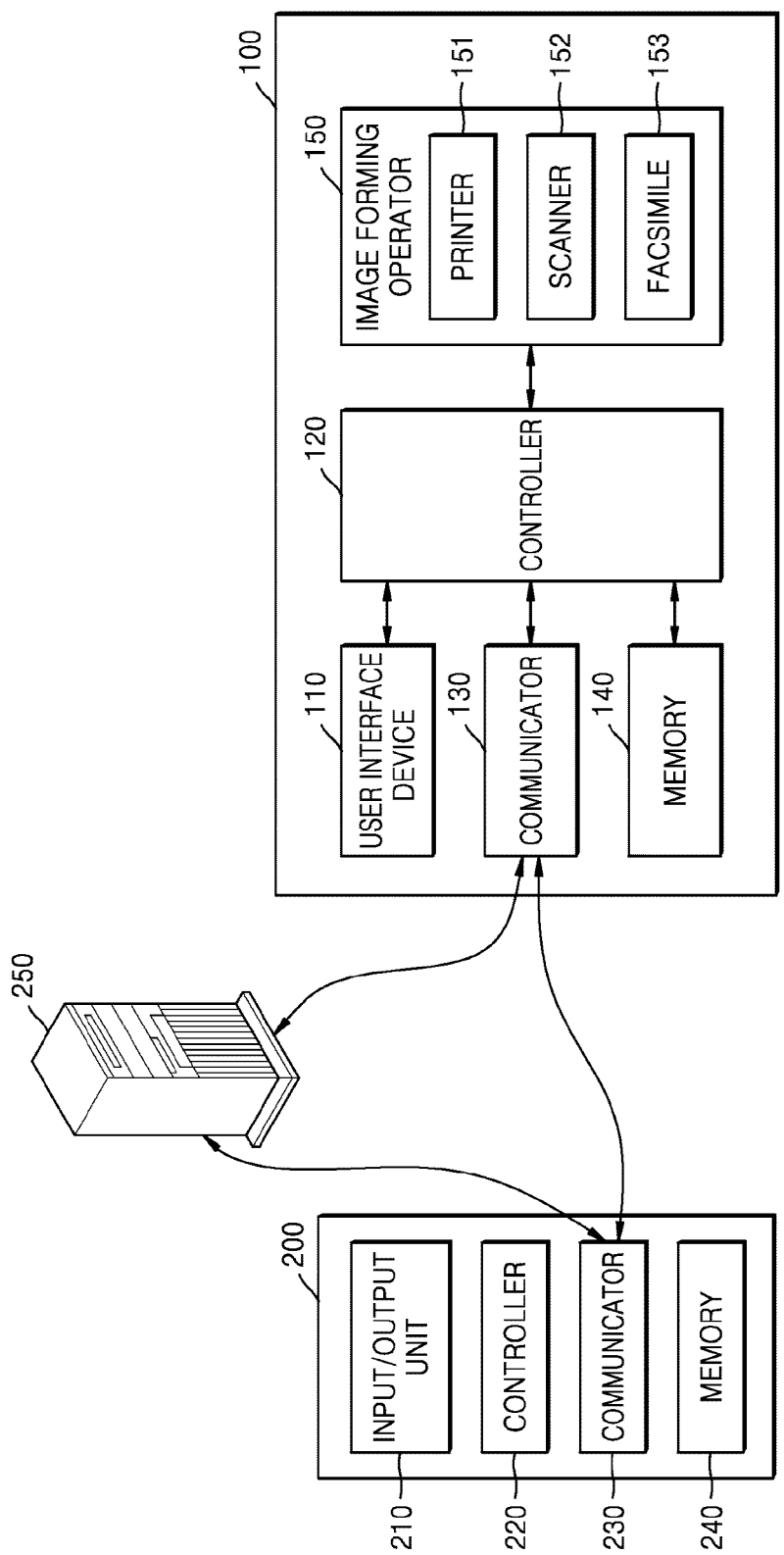

[Fig. 3]
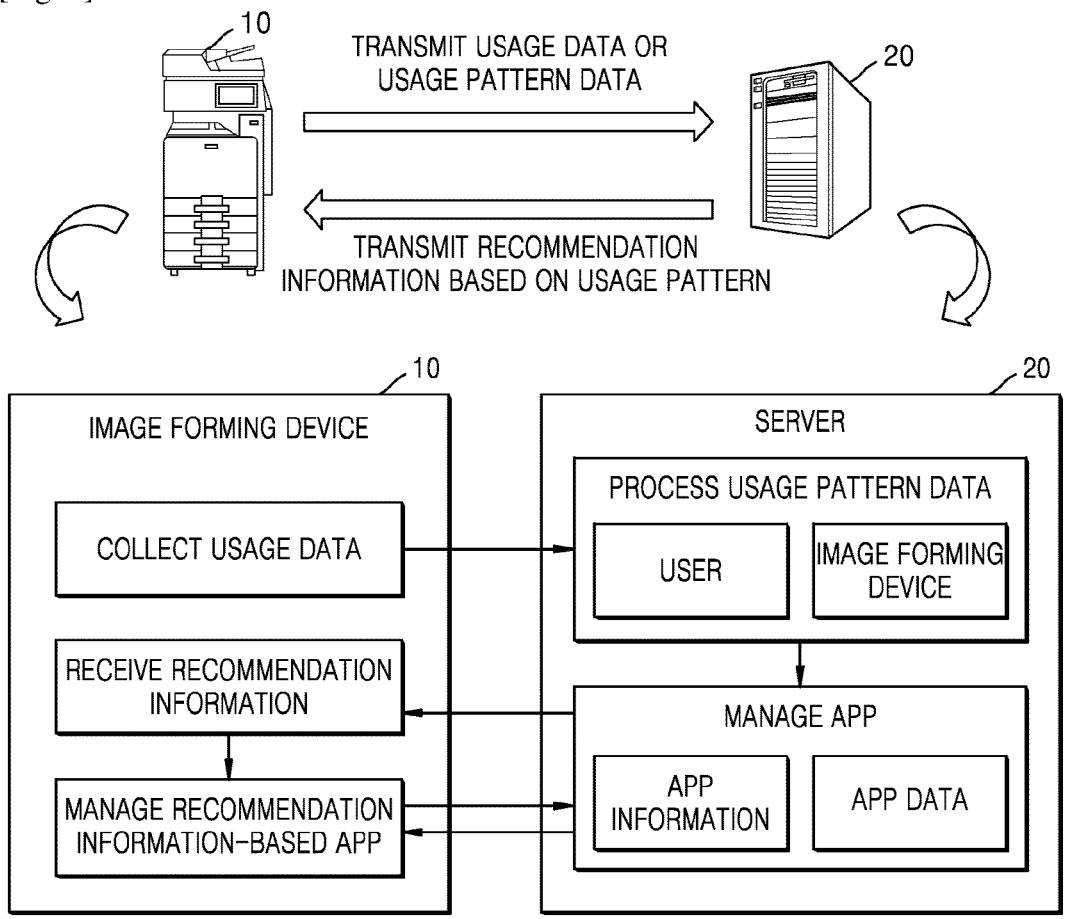
[Fig. 4]
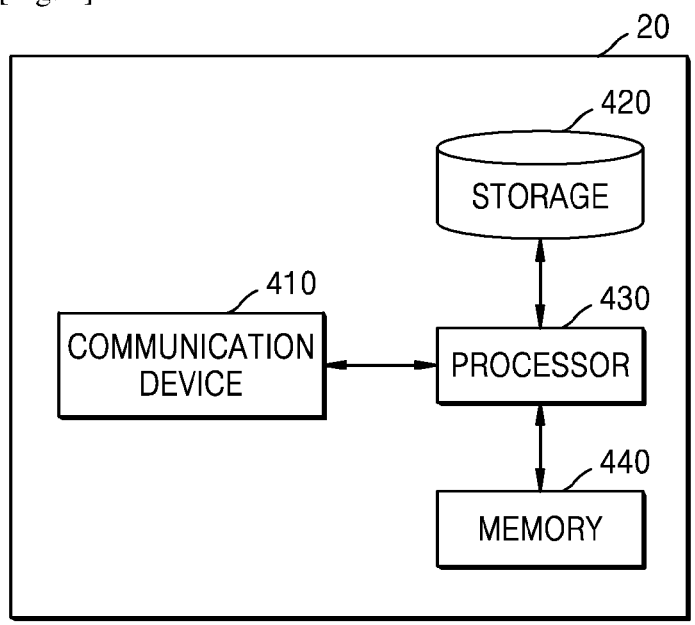

[Fig. 5]
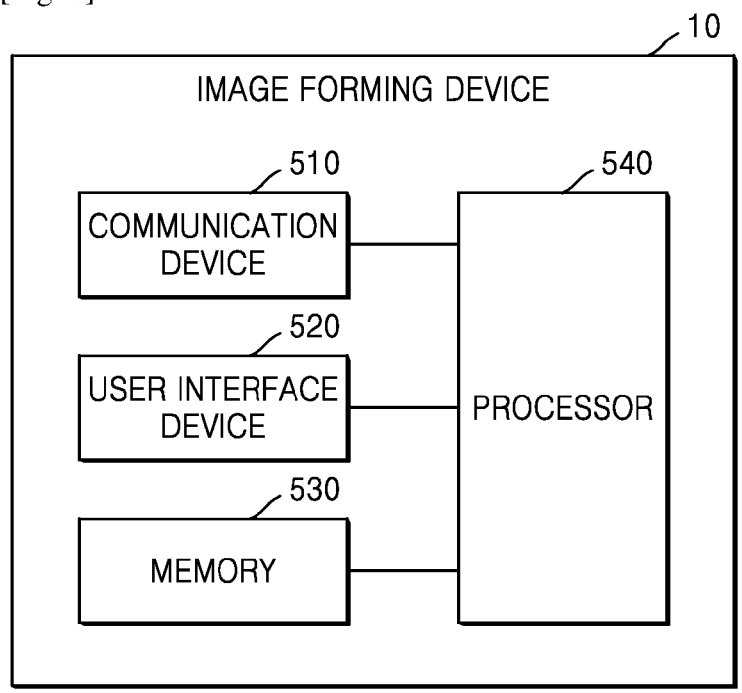

[Fig. 6]
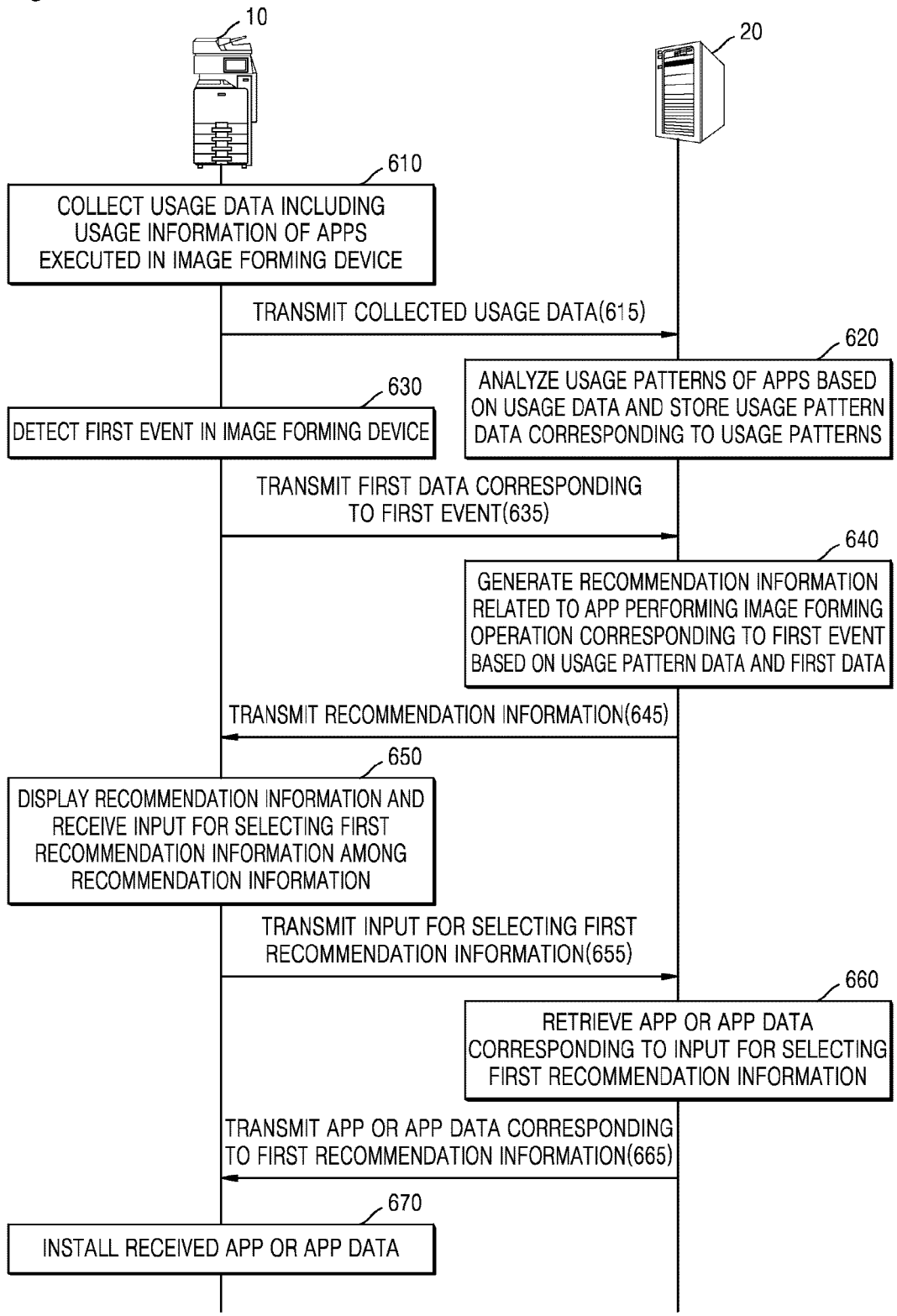

[Fig. 7]
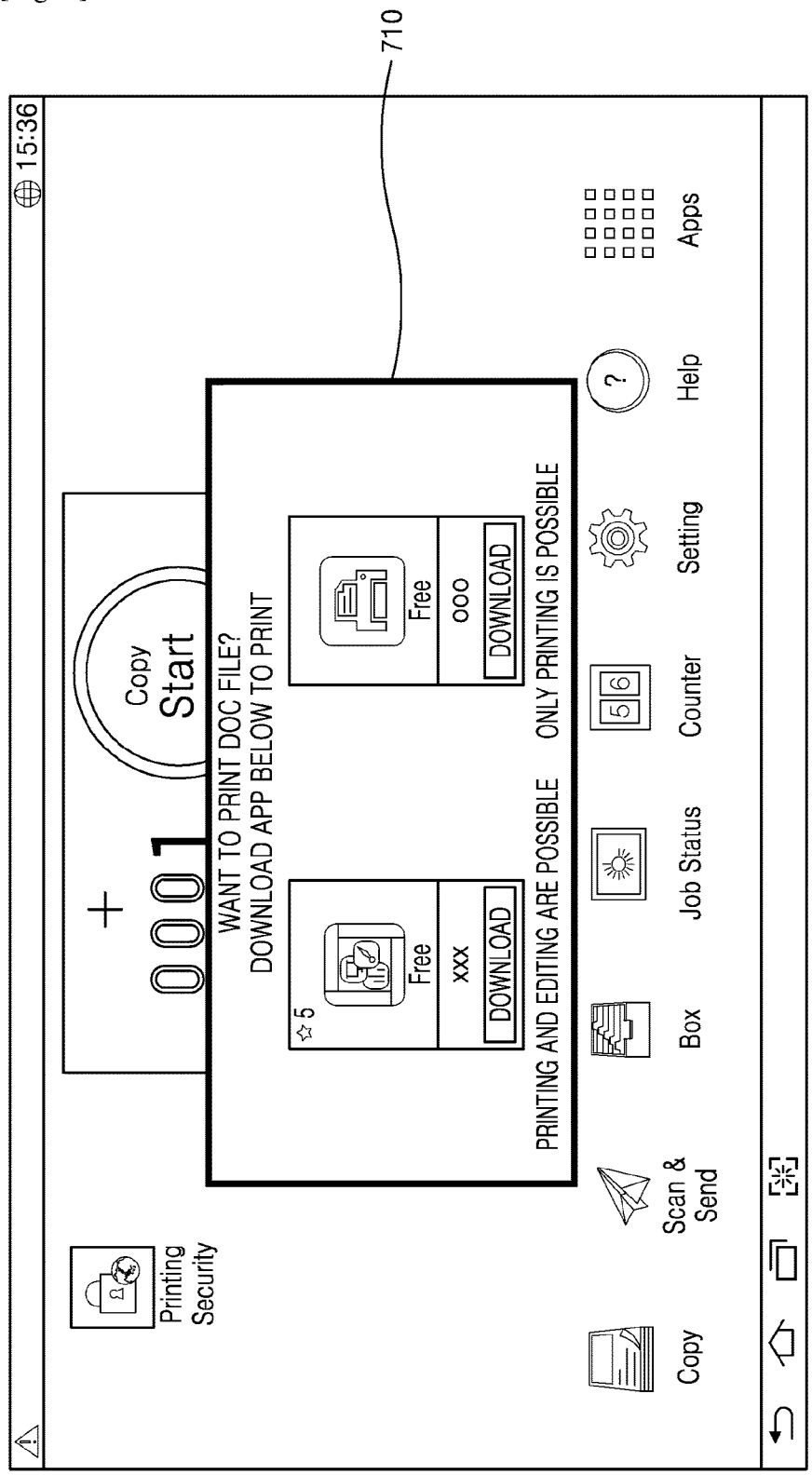

[Fig. 8A]
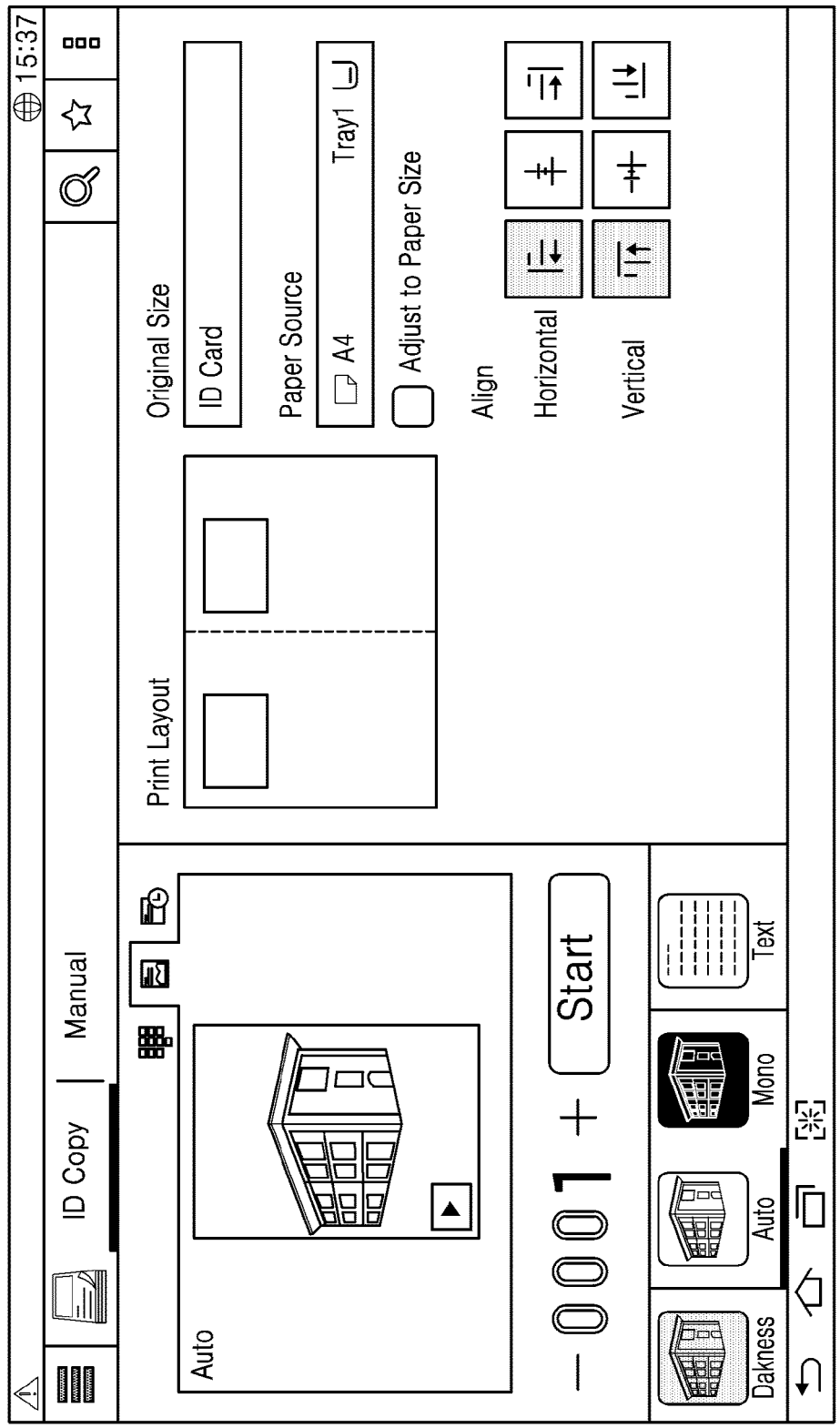

[Fig. 8B]
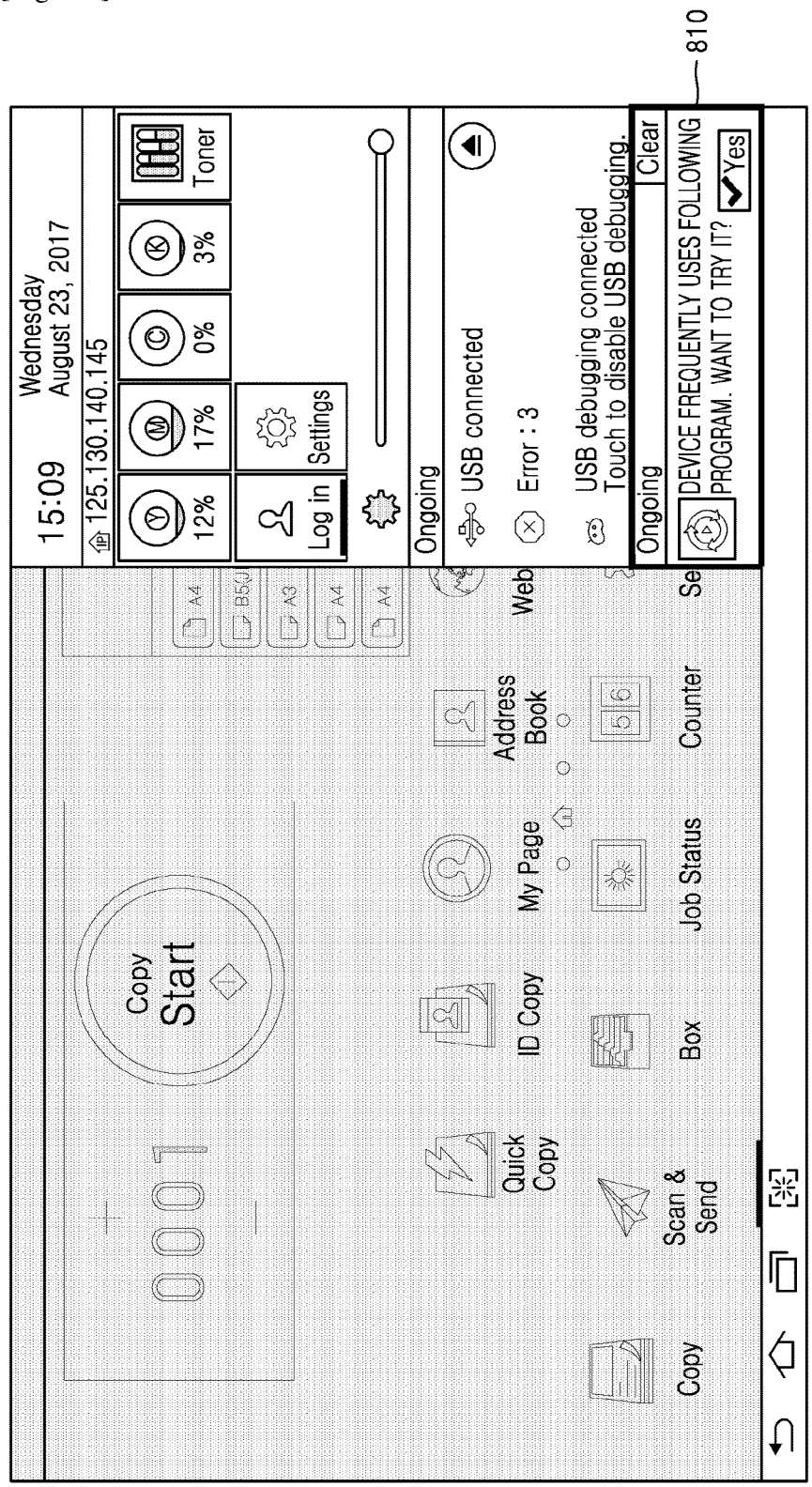

[Fig. 8C]
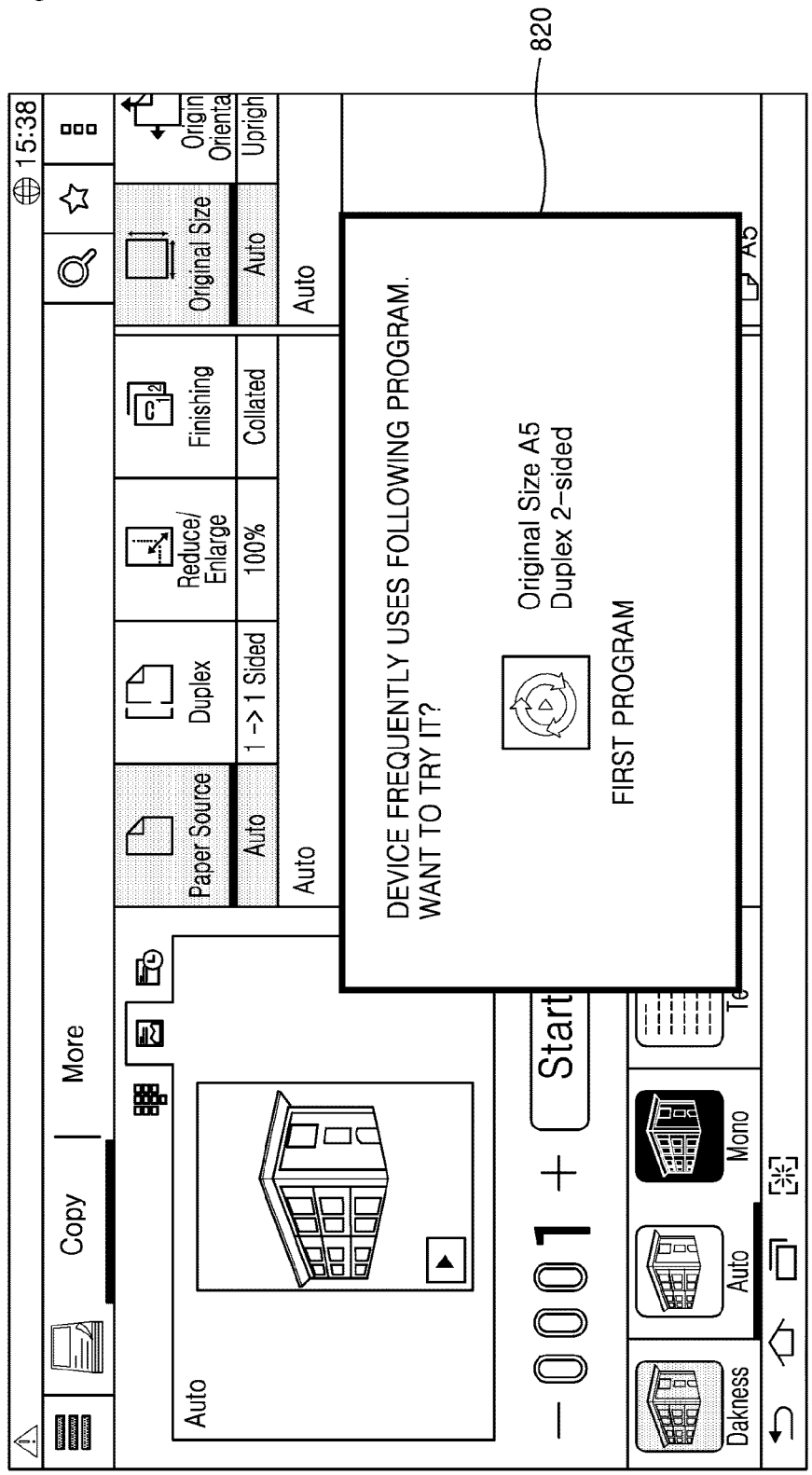

[Fig. 8D]
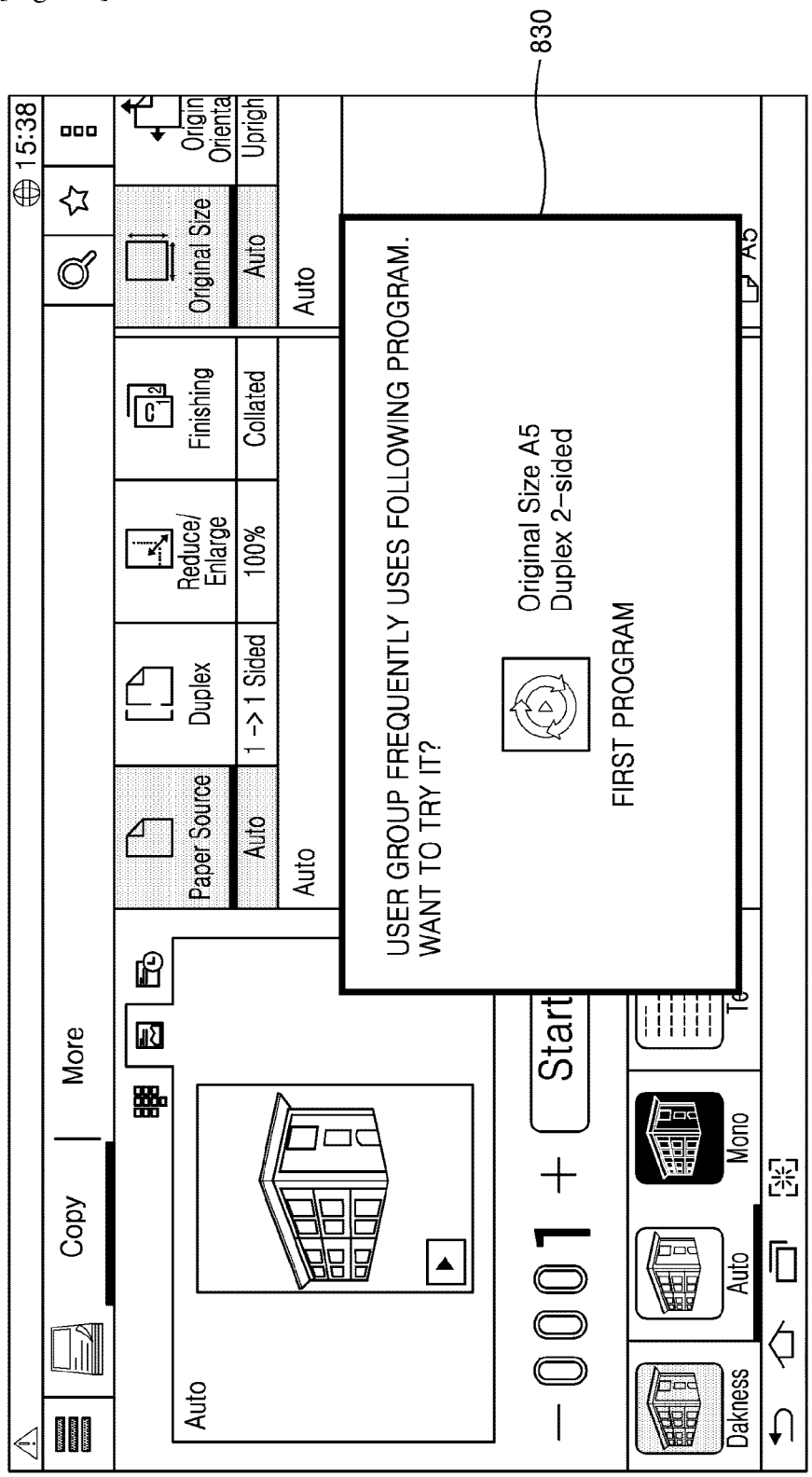

[Fig. 8E]
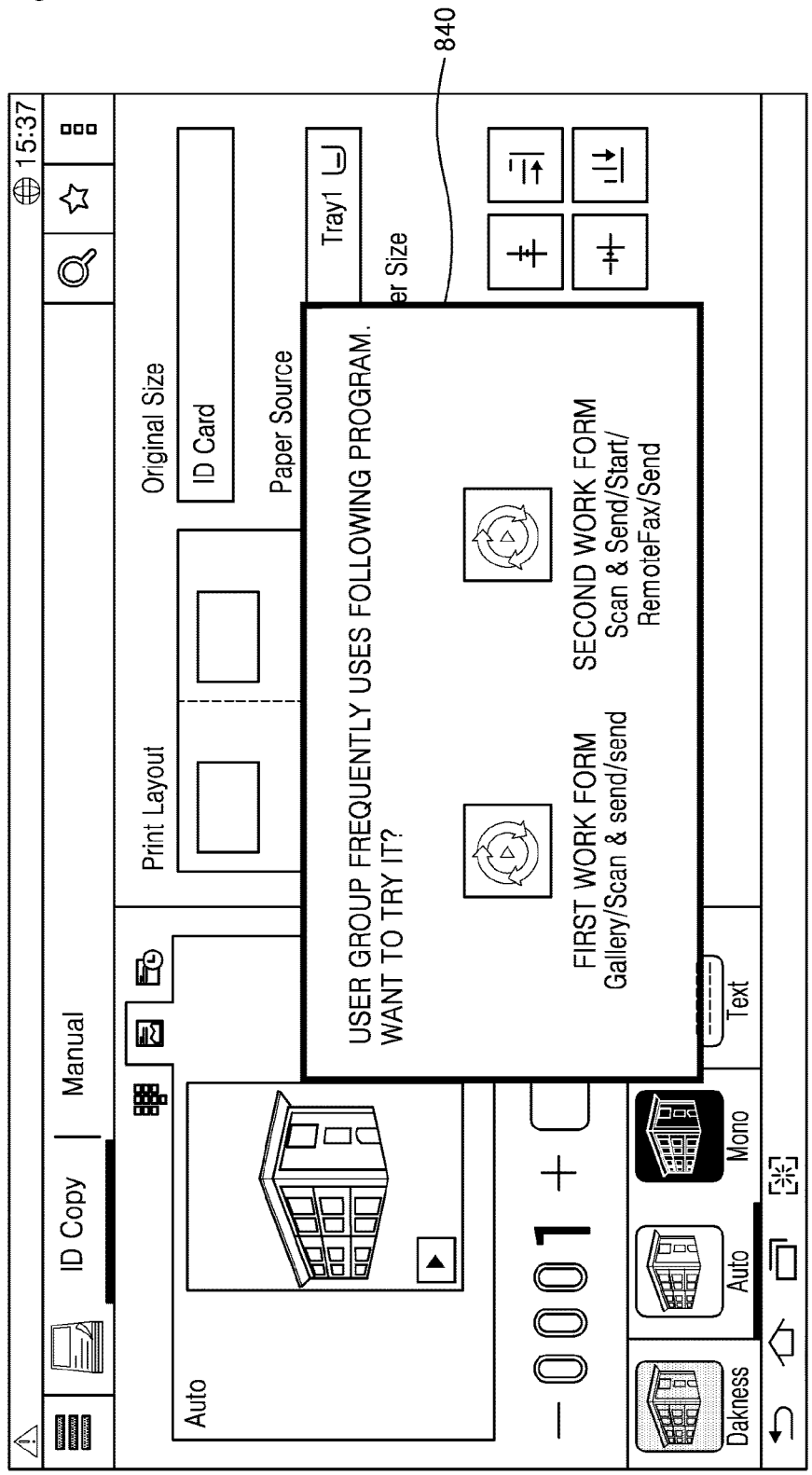

[Fig. 9]
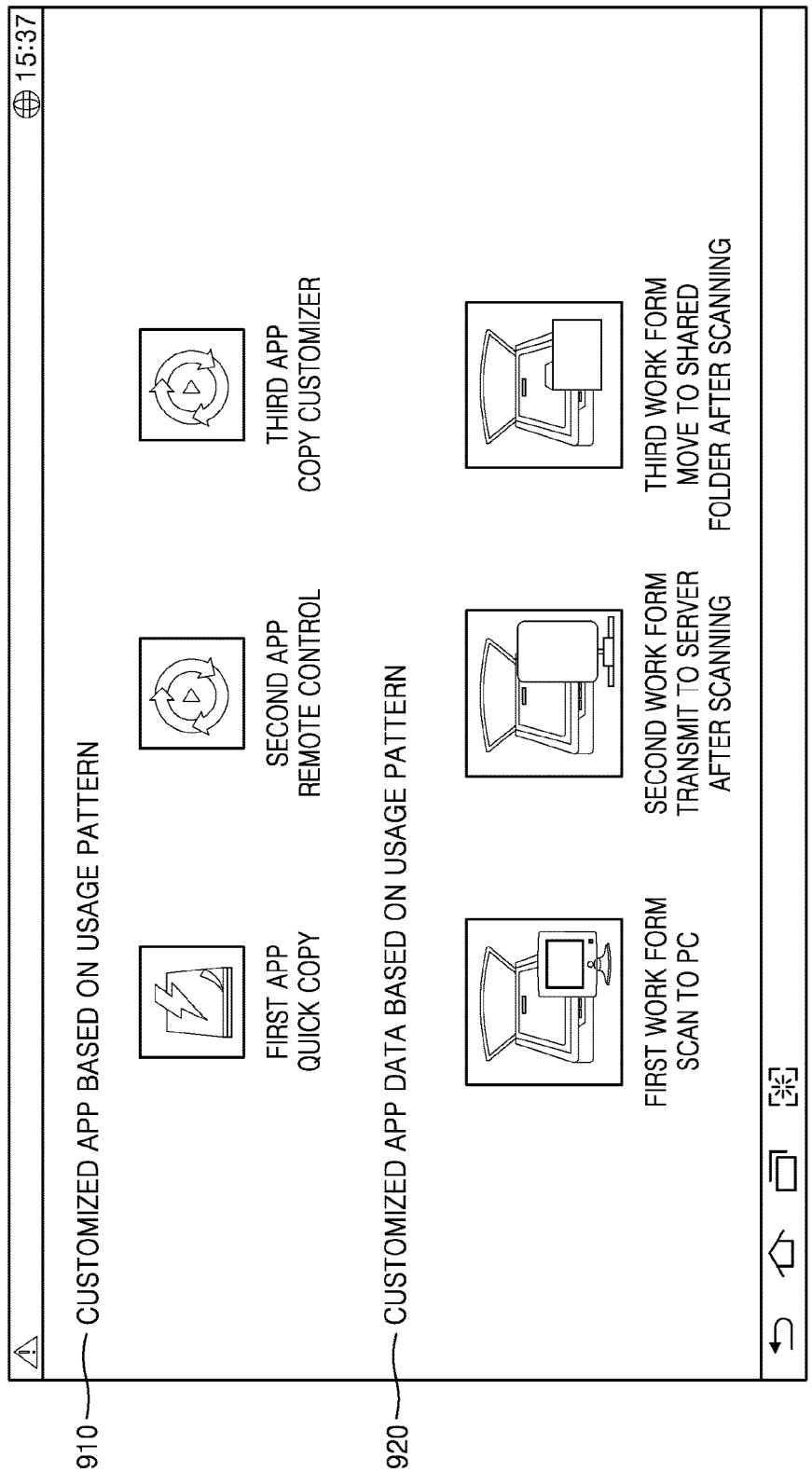

[Fig. 10]
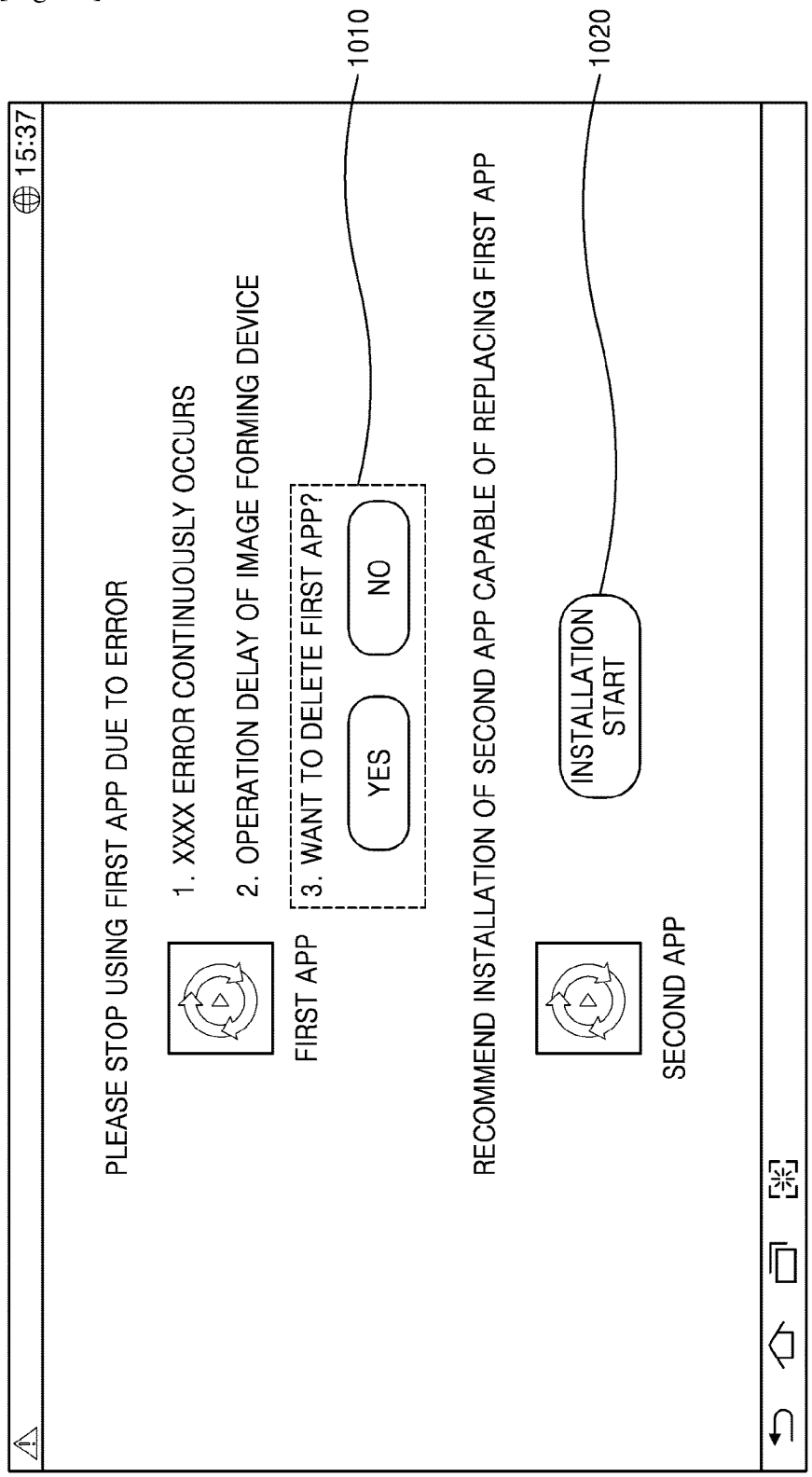

[Fig. 11]
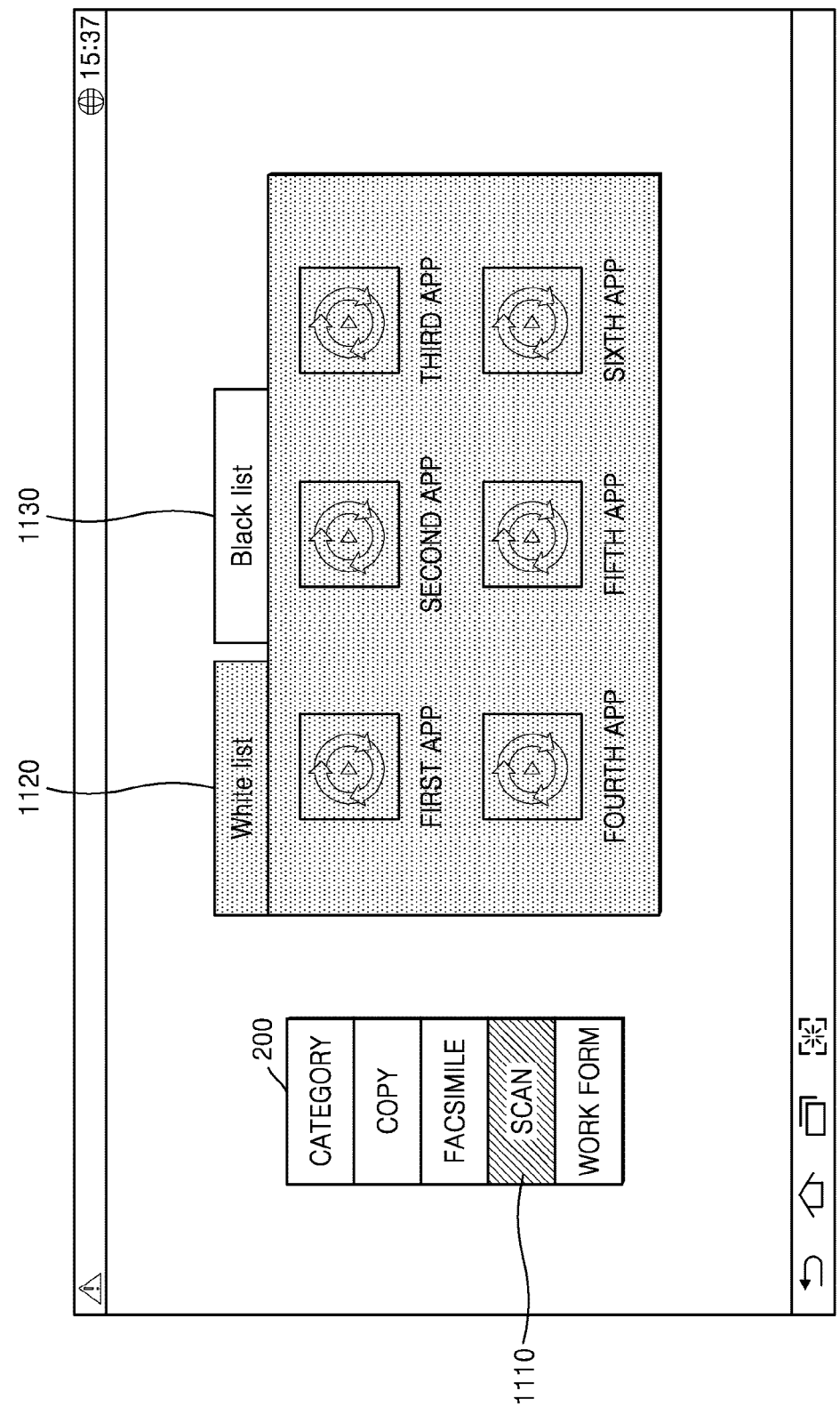

[Fig. 12]
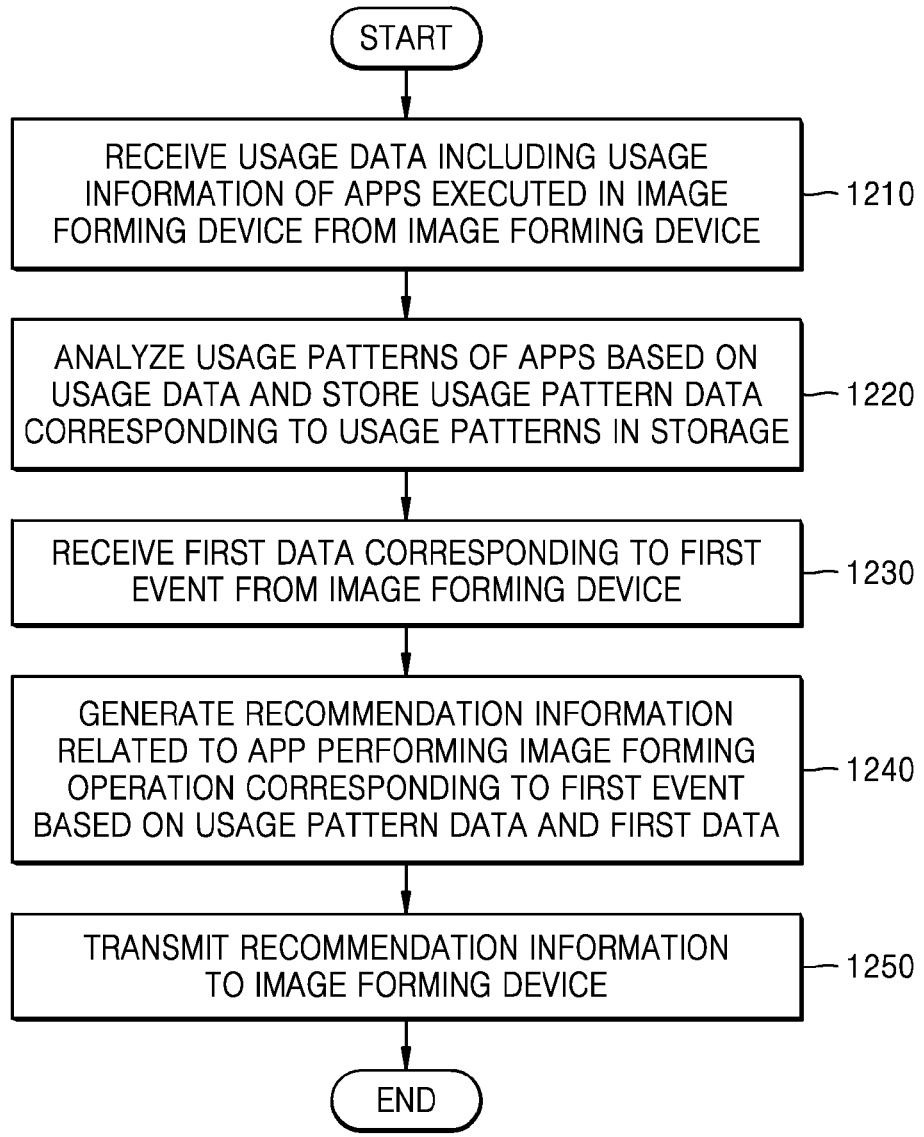

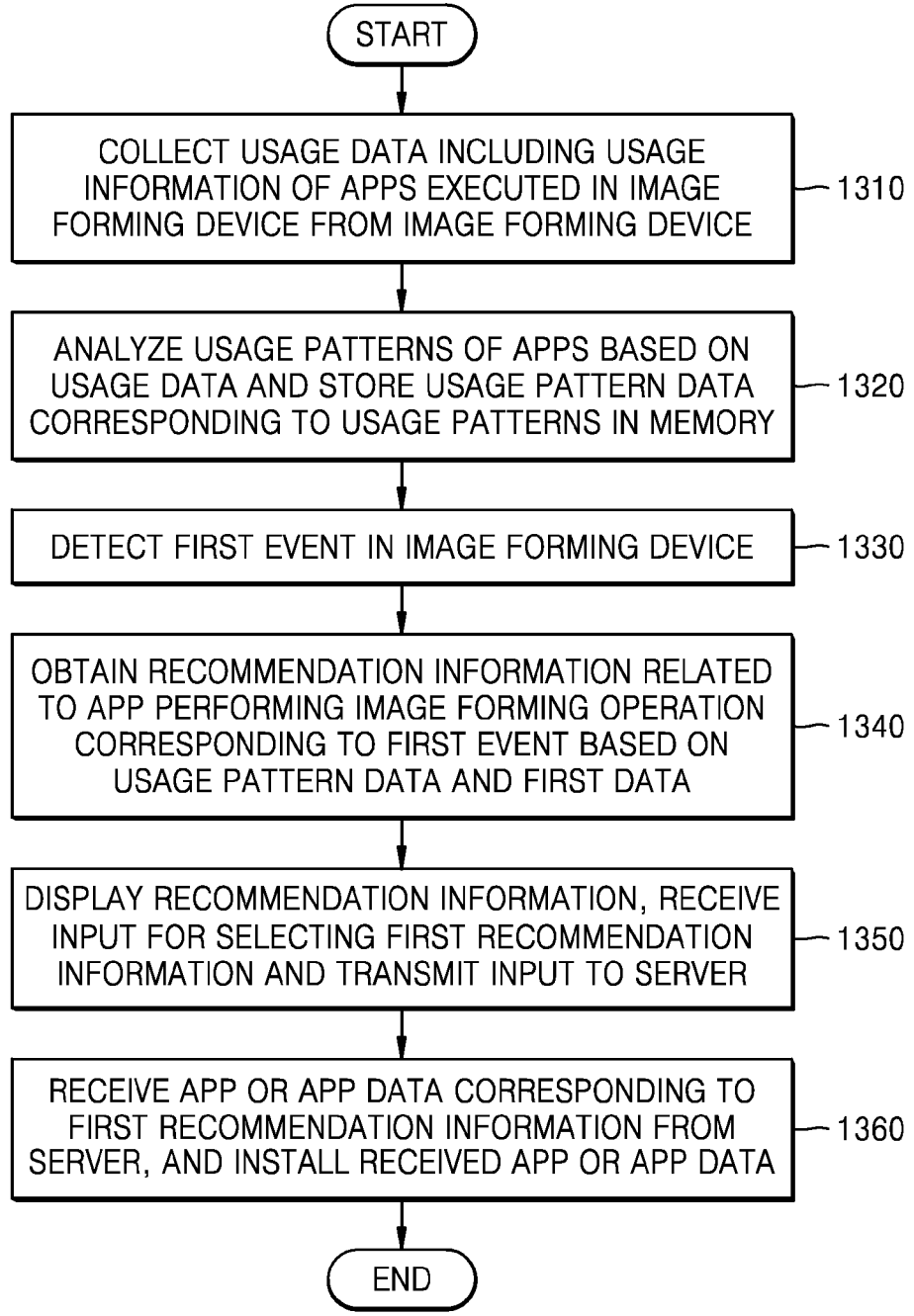
[Fig. 13]

MANAGING AND RECOMMENDING APPS TO IMAGE FORMING APPARATUS BASED ON APP USAGE PATTERNS DATA AND EVENT DATA

BACKGROUND ART

An image forming device may be, according to a user input, connected to a server that distributes applications (apps), and may download an app necessary for the image forming device and install the app therein.

A user of the image forming device may search for an app providing a function necessary for performing an image forming operation through the server. As a result of the search, the image forming device may download an app selected by the user from the server and install the downloaded app therein.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a view of a configuration of an image forming device according to an example;

FIG. 2 is a view of an image forming device connected to a user terminal or a server, according to an example;

FIG. 3 is a conceptual diagram for explaining an operation between an image forming device and a server, according to an example;

FIG. 4 is a block diagram of a server according to an example;

FIG. 5 is a block diagram of an image forming device according to an example;

FIG. 6 is a flowchart for explaining an operation between an image forming device and a server for providing recommendation information related to an application (app) used in an image forming operation based on usage patterns of apps executed in the image forming device, according to an example;

FIG. 7 is a view for explaining recommendation information provided according to a format of a file executed in an image forming device, according to an example;

FIGS. 8A to 8E are views for explaining recommendation information provided in an image forming device according to an image forming device or a user group, according to various examples;

FIG. 9 is a view for explaining recommendation information provided in an image forming device according to a usage pattern of a user, according to an example;

FIG. 10 is a view for explaining recommendation information provided in an image forming device according to an app tracking result in an image forming device, according to an example;

FIG. 11 is a view for explaining recommendation information provided in an image forming device according to a function provided in an image forming device, according to an example;

FIG. 12 is a flowchart for explaining an operation of a server, according to an example; and FIG. 13 is a flowchart for explaining an operation of an image forming device, according to an example.

Throughout the drawings, it should be noted that like reference numbers are used to depict the same or similar elements, features, parts, components, and structures.

MODE FOR THE INVENTION

An "image forming device" may be any device capable of performing an image forming operation, such as a printer, a scanner, a copier, a fax machine, a multifunction printer (MFP), or a display device. Also, "print data" may be data converted into a printable format in a printer and a "scan file" may be a file generated by scanning an image with a scanner.

Below, a description will be given about examples of the present disclosure with reference to attached drawings such that those of ordinary skill in the art may easily perform examples. In this regard, the present disclosure may have different forms and should not be construed as being limited to the descriptions set forth herein.

FIG. 1 is a view of a configuration of an image forming device according to an example.

Referring to FIG. 1, an image forming device 100 may include a user interface device 110, a controller 120, a communicator 130, a memory 140, and an image forming operator 150. Also, although not shown in FIG. 1, the image forming device 100 may further include a power source for supplying power to each component.

The user interface device 110 may include an input unit for receiving, from a user, an input for performing an image forming operation, and an output unit for displaying information, such as a result of performing the image forming operation or a status of the image forming device 100. For example, the user interface device 110 may include an operation panel for receiving a user input and a display panel for displaying a screen.

In more detail, the input unit may include at least one device for receiving various types of user inputs, such as a keyboard, a physical button, a touch screen, a camera, a microphone, or the like. Also, the output unit may include, for example, a display panel, a speaker, or the like. However, an example is not limited thereto, and the user interface device 110 may include a device supporting various inputs and outputs.

The controller 120 controls overall operations of the image forming device 100, and may include at least one processor, such as a central processing unit (CPU). The controller 120 may control other components included in the image forming device 100 such that an operation corresponding to a user input received through the user interface device 110 is performed. The controller 120 may include at least one specialized processor corresponding to each function, or may be a single integrated processor.

For example, the controller 120 may execute a program stored in the memory 140, read data or a file stored in the memory 140, or store a new file in the memory 140.

The communicator 130 may communicate with another device or a network in a wired or wireless manner. Accordingly, the communicator 130 may include a communication module, such as a transceiver, supporting at least one of various wired and wireless communication methods. For example, the communication module may be in a form of a chipset or may be a sticker or a bar code (e.g., a sticker including a near field communication (NFC) tag) including information required for communication.

The communicator 130 may support, for example, at least one of wireless fidelity (Wi-Fi), Wi-Fi direct, Bluetooth, ultra-wideband (UWB), NFC, or the like.

The communicator 130 may be connected to an external device outside the image forming device 100 to transmit and receive a signal or data to and from the external device. For example, the image forming device 100 may be connected to a user terminal through the communicator 130. The communicator 130 may transmit a signal or data received from the user terminal to the controller 120, or transmit a signal or data generated by the controller 120 to the user terminal. For example, when the communicator 130 receives a print command signal or print data from the user terminal, the controller 120 may print the received print data through a printer 151.

The image forming device 100 of FIG. 1 may support multiple platforms. As the image forming device 100 controls a status or a state of a first application (app) on a first platform among the multiple platforms, a status or a state of an app providing the same or similar service as a service provided from the first app on a platform different from the first platform may be controlled.

FIG. 2 is a view of an image forming device connected to a user terminal or a server, according to an example.

Referring to FIG. 2, a user terminal 200 may include an input/output unit 210, a controller 220, a communicator 230, and a memory 240. The controller 220 may control an image forming operation by executing a program stored in the memory 240 and transmitting a signal or data generated as a result of executing the program to the image forming device 100 through the communicator 230. The user terminal 200 may be, for example, a smart phone, a personal computer (PC), a tablet PC, a medical device, a camera, a wearable device, or the like.

The communicator 130 may be directly connected to a server 250 to transmit and receive signals or data. Also, the communicator 130 may be connected to the user terminal 200 via the server 250. That is, the communicator 130 of the image forming device 100 may transmit and receive signals or data to and from the communicator 230 of the user terminal 200 via the server 250.

Referring again to FIG. 1, various kinds of data such as programs and files such as an app may be installed and stored in the memory 140. The controller 120 may access the data stored in the memory 140 to use the data, or may store new data in the memory 140. Also, the controller 120 may execute the program installed in the memory 140 and may install an app received from an external source through the communicator 130 in the memory 140.

The image forming operator 150 may perform an image forming operation, such as printing, scanning, copying, or faxing.

Referring to FIG. 1, the image forming operator 150 includes the printer 151, a scanner 152, and a facsimile 153, but the image forming operator 150 may include some of them or may further include a component for performing another type of image forming operation.

The printer 151 may form an image on a recording medium via any one of various printing methods, such as an electrophotography method, an inkjet method, a thermal transfer method, a thermal method, or the like.

The scanner 152 may irradiate light onto paper and receive light reflected from the paper on an image sensor to read an image recorded on the paper. Examples of an image sensor for reading an image from paper include a charge-coupled device (CCD) and a contact type image sensor (CIS). The scanner 152 may have a flatbed structure in which paper is located at a fixed location and an image sensor moves to read an image, a document feed structure in which an image sensor is located at a fixed location and paper is transferred, or a combination structure thereof.

The facsimile 153 may share a component for scanning an image with the scanner 152, share a component for printing a received file with the printer 151, transmit a scan file to a destination, or receive a file from the outside.

Terms of components of the above-described image forming device 100 may vary.

Furthermore, the image forming device 100 may include at least one of the above-described components, and may omit some components or further include other components.

The user interface device 110 of FIG. 1 may be provided with a unique control system. For example, the user interface device 110 may include a control system (e.g., a controller, a memory, etc.) for controlling a user interface (UI) provided by the user interface device 110, separately from the controller 120 of the image forming device 100. Programs such as an operating system (OS) for providing the UI and an app for supporting various functions may be installed in the control system of the user interface device 110. As another example, the programs and apps may be installed in the memory 140 and accessed by the user interface device 110.

The image forming device 100 of FIG. 2 may request a list of apps available in the image forming device 100 from the server 250 through the communicator 130 and may receive information, data, files, and the like related to an app to be controlled by the image forming device 100 from the server 250. Also, the image forming device 100 of FIG. 2 may receive a command or input from the user interface device 110 or the user terminal 200 to control an app to be controlled in the image forming device 100.

FIG. 3 is a conceptual diagram for explaining an operation between an image forming device and a server, according to an example.

Referring to FIG. 3, an image forming device 10 may transmit usage data including usage information of apps executed in the image forming device 10 to a server 20. Also, the image forming device 10 may transmit usage pattern data, in which usage patterns of the apps are analyzed, to the server 20 based on the usage data. The image forming device 10 may store the usage pattern data, in which the usage patterns are analyzed, in the memory of the image forming device 10. The image forming device 10 may generate recommendation information related to an app performing an image forming operation corresponding to a first event based on the usage pattern data and data corresponding to the first event detected in the image forming device. The image forming device 10 may display the generated recommendation information on a user interface device of the image forming device 10.

The server 20 may analyze the usage patterns of the apps based on the usage data and obtain the usage pattern data corresponding to the usage patterns. The server 20 may store the usage pattern data in the storage of the server 20. In addition, the server 20 may store the usage pattern data corresponding to a usage pattern for each user in the storage of the server 20 for each image forming device 10.

The server 20 may create or otherwise use a database of information related to one or more apps corresponding to the usage patterns based on the usage pattern data. For example, the information related to the apps may be, but is not limited to, at least one of a name of an app, a function of the app, a file format supported by the app, a sequence among execution screens according to execution of the app, a setting of a predetermined function of the app, a work flow among the plurality of apps, a format of a file selected in the app, or the like. Here, as an example of a database, the server 20 may divide the name of the app, the file format supported by the app, usage pattern information of the app, and user's information about the app and store them as reference data with respect to the plurality of apps. For example, the usage pattern information of the app may be stored as a pattern to be converted between the execution screens according to the execution of the app in a uniform resource identifier (URI) format. Also, for example, the reference data may be formatted and stored in a JavaScript object notation (JSON) format.

The server 20 may receive first data corresponding to the first event from the image forming device 10. The server 20 may generate the recommendation information related to the app performing an image forming operation corresponding to the first event based on the usage pattern data and the first data. The server 20 may transmit the generated recommendation information to the image forming device 10.

An example of an operation between the image forming device 10 and the server 20 will be described in more detail. The image forming device 10 may collect the usage data including usage information of apps executed in the image forming device 10. Here, the app may include, but is not limited to, a print app, a copy app, a scan app, a fax app, an environment setting app of the image forming device 10, or the like. That is, the app may be used by the image forming device 10 to perform an image forming operation. The image forming device 10 may transmit the collected usage data to the server 20.

The server 20 may analyze the usage patterns of the apps by user and by the image forming device 10 based on the usage data. The server 20 may generate and update information related to one or more apps corresponding to the analyzed usage patterns. The server 20 may compare the first data corresponding to the first event with the information related to one or more apps corresponding to the usage patterns to determine the first usage pattern corresponding to the first event among the usage patterns. The server 20 may generate recommendation information related to at least one app that performs an image forming operation according to the first usage pattern. Here, the recommendation information may be an app list including at least one app that performs an image forming operation corresponding to the first event. In addition, the recommendation information may be first app data used for performing the image forming operation corresponding to the first event. For example, the first app data may be data in which a function of the first app is programmed, and data in which a work flow among a plurality of apps that perform a plurality of image forming operations are programmed. In addition, for example, the first app data may be, but is not limited to, at least one of a program in which a function related to the first app is programmed, a work form in which a work flow among a plurality of apps including the first app is programmed, attributes of the first app, properties of the first app, or the like. The server 20 may transmit the generated recommendation information to the image forming device 10.

The image forming device 10 may receive the recommendation information and manage an app in the image forming device 10 based on the recommendation information. For example, the image forming device 10 may receive a first app list as the recommendation information. The image forming device 10 may download and install at least one app from the server 20 according to an input for selecting at least one app used for the image forming operation from the first app list. That is, the image forming device 10 may actively obtain apps and app data related to the image forming operation, based on the usage patterns of the apps executed in the image forming device 10. Also, the image forming device 10 may obtain recommendation information corresponding to the first event detected by the image forming device 10 from the server 20.

FIG. 4 is a block diagram of a server according to an example.

Referring to FIG. 4, the server 20 may include a communication device 410, a storage 420, a processor 430, and a memory 440. However, not all elements shown in the drawings are necessary elements. The server 20 may be embodied with more or fewer elements than the elements shown in FIG. 4. Furthermore, one of a plurality of image forming devices grouped into a predetermined group may perform the same function as that of the server 20 shown in FIG. 4. Hereinafter, the elements will be described.

The server 20 of FIG. 4 may correspond to the server 250 of FIG. 2. In FIG. 4, the same reference numerals as in FIG. 2 denote the same elements, and therefore, detailed descriptions thereof will not be given herein.

The communication device 410 may perform communication with the image forming device 10. The communication device 410 may receive usage data including usage information of apps executed in the image forming device 10 from the image forming device 10.

The storage 420 may store various software, programs, apps, data, and information to provide services related to apps available in the image forming device 10. For example, the information may be related to attributes of apps or app data. The information related to attributes of apps may be, but is not limited to, at least one of a name of an app, a function of the app, a file format supported by the app, or the like. Further, the information related to app data may be at least one of a sequence among execution screens according to execution of the app, setting of a predetermined function of the app, a work flow among a plurality of apps, or the like. In addition, for example, the storage 420 may store various data used in programs, apps, and services related to the apps, which are executed by the server 20 that provides services related to the apps available in the image forming device 10.

The storage 420 may store and manage usage pattern data corresponding to usage patterns of apps in a database. Here, the storage 420 may store the usage pattern data for each of the apps by the image forming device 10 or by user.

The memory 440 may store instructions executable by the processor 430, such as software or programs. For example, the memory 440 may store instructions for receiving usage data including the usage information of apps executed in the image forming device 10, instructions for analyzing the usage patterns of apps based on the usage data and storing usage pattern data corresponding to the usage patterns in the storage 420, instructions for receiving first data corresponding to a first event from the image forming device 10, instructions for generating recommendation information related to an app that performs an image forming operation corresponding to the first event based on the usage pattern data and the first data, instructions for transmitting the recommendation information to the image forming device 10, or the like.

The processor 430 may execute the instructions stored in the memory 440. The processor 430 may control the server 20 providing services related to the apps available in the image forming device 10. The processor 430 may obtain information, data, and requests received via the communication device 410 and store the received information or data in the storage 420. The processor 430 may process the received information or data.

The processor 430 may analyze the usage patterns of the apps based on the usage data and store usage pattern data corresponding to the usage patterns in the storage 420. In more detail, the processor 430 may obtain a pattern that is changed among execution screens output as the apps are executed in the image forming device 10 from the usage data. The processor 430 may analyze the usage patterns of the apps based on the changed pattern among the execution screens.

The processor 430 may store usage pattern data corresponding to at least one of a sequence among execution screens of the first app executed in the image forming device 10, a setting of a predetermined function of the first app, a work flow among a plurality of apps in the storage 420, or the like.

The processor 430 may also obtain usage frequency information from usage data, including usage frequency of apps for each user or usage frequency of functions used in the apps. The processor 430 may analyze the usage patterns of apps for each user based on the usage frequency information for each user.

The processor 430 may receive the first data corresponding to the first event from the image forming device 10 through the communication device 410. The processor 430 may generate recommendation information related to the app performing an image forming operation corresponding to the first event based on the usage pattern data and the first data.

In more detail, the processor 430 may determine a first usage pattern corresponding to the first event among the usage patterns of the apps based on the first data. The processor 430 may generate recommendation information related to at least one app that performs an image forming operation according to the first usage pattern.

The processor 430 may generate a first app list including at least one app that performs an image forming operation corresponding to the first event based on the usage pattern data and the first data.

In addition, the processor 430 may generate first app data, which is used to perform an image forming operation, based on the usage pattern data and the first data. In more detail, the processor 430 may generate app data in which a function of the first app that performs the image forming operation corresponding to the first event is programmed. Here, the app data in which the function of the first app is programmed may be data in which a predetermined function having high usage frequency is programmed based on a usage pattern. Also, the processor 430 may generate app data in which a work flow among a plurality of apps performing a plurality of image forming operations corresponding to the first event is programmed. Here, the app data in which a work flow among the plurality of apps is programmed may be data programmed so that the plurality of apps may interact with each other by a single execution to perform the plurality of image forming operations. The work flow may be predefined by a user.

The processor 430 may receive a plurality of pieces of usage data including usage information of apps executed in each of a plurality of image forming devices 10 from the plurality of image forming devices 10 through the communication device 410. The processor 430 may generate reference data corresponding to a usage pattern of each app based on the plurality of pieces of usage data. The processor 430 may store the generated reference data in the storage 420. Here, the reference data may include, for each app, a name of the app, a file format supported by the app, usage pattern information of the app, user's information about the app, or the like. For example, the usage pattern information of the app may store a pattern to be converted between execution screens according to the execution of the app in a URI format. Also, for example, the reference data may be formatted and stored in a JSON format. The reference data may include, with respect to each of work forms corresponding to the work flow, a function of the work form, pattern information of the work form, user information, or the like. The processor 430 may generate recommendation information related to an app performing an image forming operation corresponding to the first event based on a result of comparing the reference data with the first data.

The processor 430 may transmit the recommendation information to the image forming device 10 through the communication device 410.

Various applications or operations performed by a server, such as the server 20, will be described below. However, the features, which may be clearly understood and expected by those of ordinary skill in the art even without specifying any one of the communication device 410, the storage 420, the processor 430, and the memory 440 of the server 20, may be understood by general implementation, and the scope of the present disclosure is not limited by the physical/logical structures or the terms of specific configurations.

FIG. 5 is a block diagram of an image forming device according to an example.

Referring to FIG. 5, the image forming device 10 may include a communication device 510, a user interface device 520, a memory 530, and a processor 540. However, not all elements shown in the drawings are necessary elements. The image forming device 10 may be embodied with more or fewer elements than the elements shown in the drawings. Hereinafter, the elements will be described.

The communication device 510 may correspond to the communicator 130 shown in FIG. 1, the user interface device 520 may correspond to the user interface device 110 shown in FIG. 1, the memory 530 may correspond to the memory 140 shown in FIG. 1, and the processor 540 may correspond to the controller 120 shown in FIG. 1. In FIG. 5, the same reference numerals as in FIG. 1 denote the same elements, and therefore, detailed descriptions thereof will not be given herein.

The communication device 510 may communicate with an external device. For example, the communication device 510 may transmit usage data including usage information of apps executed in the image forming device 10 to the server 20. Here, the server 20 may provide services related to the apps available in the image forming device 10. Furthermore, the communication device 510 may transmit data processed in the image forming device 10 to the server 20 and may receive data to be used in the image forming device 10 from the server 20.

The user interface device 520 may receive a user input and display information related to the image forming device 10. For example, the user interface device 520 may display a screen requiring a user input according to an operation of the processor 540, a screen displaying a result of an operation of the processor 540, a screen displaying a state of the image forming device 10, a screen displaying information of apps installed in the image forming device 10, or the like. For example, the user interface device 520 may display recommendation information related to an app performing an image forming operation. Here, the recommendation information may be information received from the server 20, or information generated in the image forming device 10. In addition, the user interface device 520 may receive an input for selecting first recommendation information from the recommendation information. The user interface device 520 may transmit the received input to the processor 540 or to the server 20 through the communication device 510.

The memory 530 may store programs, data or files associated with the image forming device 10. For example, the processor 540 may execute a program stored in the memory 530, read data or a file stored in the memory 530, store a new file in the memory 530, or the like. The memory 530 may store program commands, data files, data structures or a combination thereof. The memory 530 may store instructions executable by the processor 540.

For example, the memory 530 may store instructions for collecting usage data including the usage information of apps executed in the image forming device 10, instructions for analyzing usage patterns of apps based on the usage data and storing usage pattern data corresponding to the usage patterns in the memory 530, instructions for detecting the first event in the image forming device 10, instructions for obtaining recommendation information related to an app that performs an image forming operation corresponding to the first event based on the usage pattern data and first data corresponding to the first event, instructions for controlling the recommendation information to be displayed on the user interface device 520, or the like.

The processor 540 may collect usage data including the usage information of the apps executed in the image forming device 10. The processor 540 may analyze the usage patterns of the apps based on the usage data and store the usage pattern data corresponding to the usage patterns in the memory 530. In more detail, the processor 540 may obtain usage pattern data based on information corresponding to at least one of a sequence among execution screens of the first app executed in the image forming device 10, a setting of a predetermined function of the first app, a work flow among a plurality of apps, or the like. The processor 540 may also obtain usage pattern data based on usage frequency information of apps for each user logged in the image forming device 10.

The processor 540 may transmit the usage data or the usage pattern data to the server 20 through the communication device 510. That is, the processor 540 may control the communication device 510 to transmit the usage data or usage pattern data to the server 20.

The processor 540 may detect the first event in the image forming device 10. The processor 540 may obtain recommendation information related to the app that performs the image forming operation corresponding to the first event based on the usage pattern data and the first data corresponding to the first event. In more detail, the processor 540 may generate a first app list including at least one app that performs the image forming operation corresponding to the first event based on the usage pattern data and the first data. In addition, the processor 540 may generate first app data, which is used to perform an image forming operation, based on the usage pattern data and the first data.

Furthermore, the processor 540 may transmit the usage pattern data and the first data corresponding to the first event to the server 20 through the communication device 510. The processor 540 may receive recommendation information obtained based on a result of comparing the first data with reference data corresponding to a usage pattern of each of apps stored in the server 20 from the server 20. The recommendation information received from the server 20 may be the first app list including at least one app that performs the image forming operation corresponding to the first event. In addition, the recommendation information received from the server 20 may be first app data used for performing the image forming operation.

The processor 540 may control the recommendation information to be displayed on the user interface device 520.

The processor 540 may receive an input to select the first recommendation information among the recommendation information through the user interface device 520, and may transmit an input to select the first recommendation information to the server 20 through the communication device 510. The processor 540 may receive an app or app data corresponding to the first recommendation information from the server 20 through the communication device 510. The processor 540 may install the received app or app data in the image forming device 10.

Various applications or operations performed by, an image forming device, such as the image forming device 10, will be described below. However, the features, which may be clearly understood and expected by those of ordinary skill in the art even without specifying any one of the communication device 510, the user interface device 520, the memory 530, and the processor 540 of the image forming device 10, may be understood by general implementation, and the scope of the present disclosure is not limited by the physical/logical structures or the terms of specific configurations.

FIG. 6 is a flowchart for explaining an operation between an image forming device and a server for providing recommendation information related to an app used in an image forming operation based on usage patterns of apps executed in the image forming device, according to an example.

Referring to FIG. 6, the image forming device 10 may collect usage data including usage information of apps executed in the image forming device 10 in operation 610. In operation 615, the image forming device 10 may transmit the collected usage data to the server 20.

In an example, one of a plurality of image forming devices grouped into a predetermined group may perform the same function as that of the server 20 shown in FIG. 4. For example, the image forming device 10 may transmit the usage data to an image forming device performing the same function as that of the server 20. That is, a process performed in the server 20 may be the same as a process performed in the image forming device serving as the server 20. Hereinafter, a description of an operation of the image forming device serving as the server 20 will not be given herein.

In operation 620, the server 20 may analyze usage patterns of the apps based on the usage data and store the usage pattern data corresponding to the usage patterns in a storage.

In operation 630, the image forming device 10 may detect a first event in the image forming device 10. In operation 635, the image forming device 10 may transmit the first data corresponding to the first event to the server 20.

In operation 640, the server 20 may generate recommendation information related to an app performing an image forming operation corresponding to the first event based on the usage pattern data and the first data. In operation 645, the server 20 may transmit the recommendation information to the image forming device 10.

In operation 650, the image forming device 10 may display the received recommendation information on the user interface device 520. The user interface device 520 of the image forming device 10 may receive an input for selecting first recommendation information among the recommendation information. In operation 655, the image forming device 10 may transmit the input for selecting the first recommendation information to the server 20.

In operation 660, the server 20 may retrieve an app or app data corresponding to the input for selecting the first recommendation information. In operation 665, the server 20 may transmit an app or app data corresponding to the first recommendation information.

In operation 670, the image forming device 10 may install the received app or app data in the image forming device 10.

FIG. 7 is a view for explaining recommendation information provided according to a format of a file executed in an image forming device, according to an example.

Referring to FIG. 7, the image forming device 10 may detect an event generated in the image forming device 10. As an example, a user may attempt to print a first file having a 'doc' file format in the image forming device 10. When the image forming device 10 does not have an app capable of executing the file having the 'doc' file format, the image forming device 10 may attempt to print the first file having the 'doc' file format, and may detect a first event indicating that the image forming device 10 does not have an app capable of executing the file having the 'doc' file format. The image forming device 10 may transmit first data corresponding to the first event to the server 20. The image forming device 10 may receive a first app list including at least one app that performs an image forming operation corresponding to the first event. Here, the first app list may include an app supporting a function of printing the first file having the 'doc' file format, an app supporting a function of printing and editing the first file having the 'doc' file format, or the like.

As shown in FIG. 7, the image forming device 10 may display a first app list 710, which includes an app supporting a function of printing a file having a 'doc' file format, and an app supporting a function of printing and editing a file having a 'doc' file format, on the user interface device 520. The first app list 710 may include an icon of the app, detailed information related to the app, a recommendation text phrase related to the app, or the like. For example, the recommendation text phrase may be a phrase such as "Want to print a Doc file? Download the app below to print" as shown in FIG. 7.

The image forming device 10 may receive an input for selecting an app that supports a function of printing and editing the first file having the 'doc' file format from the first app list. The image forming device 10 may transmit the input to the server 20 and may download the app that supports the function of printing and editing the first file having the 'doc' file format from the server 20. The image forming device 10 may install the downloaded app.

FIGS. 8A to 8E are views for explaining recommendation information provided in an image forming device according to an image forming device or a user group, according to various example.

FIG. 8A is a view for explaining an execution screen displayed on a user interface device of an image forming device according to execution of a copy app in the image forming device, according to an example.

Referring to FIG. 8A, a user may execute the copy app and select an ID copy function from the copy app. The user interface device 520 of the image forming device 10 may receive an input for selecting the ID copy function and display an execution screen according to execution of the ID copy function.

FIG. 8B is a view for explaining a notification bar for providing information related to an image forming device in a user interface device of the image forming device, according to an example.

Referring to FIG. 8B, the notification bar may include, but is not limited to, information indicating a state of a toner in the image forming device 10, information indicating a state of components of the image forming device 10, information of a user logged in to the image forming device 10, information indicating an environment setting of the image forming device 10, information indicating whether an external device is connected to the image forming device 10, notification information related to functions currently executed in the image forming device 10, or the like.

The user interface device 520 may display notification information 810 related to the functions currently executed in the image forming device 10 on the notification bar. As shown in FIG. 8B, the user interface device 520 may display the notification information 810 such as "The device frequently uses the following program. Want to try it?" on the notification bar. Upon receiving an input for selecting the notification information 810, the user interface device 520 may display a pop-up window 820 including information of the notification information 810, as shown in FIG. 8C.

FIG. 8C shows a pop-up window for recommending a frequently used program in an image forming device, according to an example.

Referring to FIG. 8C, a printing function may be executed in the image forming device 10. The image forming device 10 may detect an event in which the printing function is executed and obtain recommendation information related to the printing function. As shown in FIG. 8C, the user interface device 520 may display the pop-up window 820 displaying a first program that is programmed to print on both sides of A5 size paper. When the image forming device 10 receives an input for selecting the first program, the first program may be downloaded from the server 20 and installed. When the first program is installed, a user may print a file to be printed on both sides of A5 paper without any additional print setting for the file to be printed.

FIG. 8D shows a pop-up window for recommending frequently used app data for each user group in an image forming device, according to an example.

Referring to FIG. 8D, the image forming device 10 may receive a user's login when a user desires to use the image forming device 10. The image forming device 10 may obtain usage frequency information including usage frequency of apps for a logged-in user or usage frequency of functions used in the apps from usage data including usage frequency of the apps. The image forming device 10 may analyze usage patterns of the apps used by the user based on the usage frequency information of the user. The image forming device 10 may obtain recommendation information corresponding to a first event detected by the image forming device 10 according to the analyzed usage patterns. In this case, the image forming device 10 may obtain the recommendation information corresponding to the first event based on a usage pattern of a user group to which the logged-in user belongs. Here, the recommendation information may be first app data used for performing an image forming operation corresponding to the first event. The first app data may be data in which a function of the first app performing the image forming operation corresponding to the first event is programmed.

As shown in FIG. 8D, the user interface device 520 may display first app data that is frequently used by the user group to which the logged-in user belongs on a pop-up window 830. Here, the first app data may be a "first program" that is programmed to print a file to be printed on both sides of A5 size paper. When the image forming device 10 receives an input for selecting the first program, the first program may be downloaded from the server 20 and installed.

FIG. 8E shows a pop-up window for recommending frequently used app data for each user group in an image forming device, according to another example.

Referring to FIG. 8E, the image forming device 10 may obtain recommendation information corresponding to the first event based on the usage pattern of the user group to which the logged-in user belongs. Here, the recommendation information may be first app data used for performing an image forming operation corresponding to the first event. The first app data may be data in which a work flow among a plurality of apps performing a plurality of image forming operations is programmed.

As shown in FIG. 8E, the user interface device 520 may display the first app data that is frequently used by the user group to which the logged-in user belongs on a pop-up window 840. Here, the first app data may be a "first work form" supporting a gallery folder execution function and a scan/transmission function and a "second work form" supporting a scan/transmission function and a fax function. Of course, the first app data may be a work form other than the work form shown in FIG. 8E. When the image forming device 10 receives an input for selecting the second work form, the second work form may be downloaded from the server 20 and installed. When the second work form is installed, a user may scan a file to be scanned and send the file to a facsimile at a time.

FIG. 9 is a view for explaining recommendation information provided in an image forming device according to a usage pattern of a user, according to an example.

Referring to FIG. 9, the image forming device 10 may obtain app usage information for each user from usage data including usage information of apps executed in the image forming device 10. The image forming device 10 may also obtain usage frequency information from usage data, including usage frequency of apps for each user and usage frequency of functions used in the apps. The image forming device 10 may analyze the usage patterns of the apps for each user based on the usage frequency information for each user. The image forming device 10 may display recommendation information corresponding to the first event according to the analyzed usage patterns.

The image forming device 10 may transmit the collected usage data to the server 20 and receive recommendation information generated from the server 20. The image forming device 10 may display the received recommendation information.

For example, when a user logs in to the image forming device 10, the user interface device 520 may display a customized app or customized app data based on a usage pattern of the user. As shown in FIG. 9, the user interface device 520 may display an app list 910 including a first app supporting a quick copy function, a second app supporting a remote control function of the image forming device 10, and a third app supporting a copy optimization function. Also, the user interface device 520 may display an app data list 920 including a first work form supporting a function of transmitting a scan file to a PC after scanning, a second work form supporting a function of transmitting a scan file to the server 20 after scanning, and a third work form supporting a function of moving a scan file to a shared folder after scanning.

FIG. 10 is a view for explaining recommendation information provided in an image forming device according to an app tracking result in the image forming device, according to an example.

Referring to FIG. 10, the image forming device 10 may track operations of an app each time the app installed in the image forming device 10 is executed. That is, the image forming device 10 may track operations of apps such as whether the operations of the apps are normally performed, whether there is a correlation between the apps according to execution of the apps, whether the image forming device 10 is changed to an overload state according to the operations of the apps, or the like. The image forming device 10 may generate recommendation information related to an app and display the generated recommendation information based on a result of the app tracking.

The image forming device 10 may transmit tracking data as the result of the app tracking to the server 20, and may receive the generated recommendation information from the server 20. Here, when the image forming device 10 transmits unanalyzed tracking data to the server 20, the server 20 may analyze the operations of the apps based on the tracking data. The image forming device 10 may display the received recommendation information.

For example, the user interface device 520 may display recommendation information obtained based on a result of first app tracking. As shown in FIG. 10, the user interface device 520 may display a recommendation for the first app, such as "Please stop using the first app due to error." In addition, the user interface device 520 may display information including a problem caused by an operation of the first app, such as "XXXX error continuously occurs, operation delay of the image forming device 10 due to the operation of the first app." Furthermore, the user interface device 520 may display recommendation information 1010 such as "Want to delete the first app?" Also, the user interface device 520 may display recommendation information for inducing installation of a second app capable of replacing the first app. When the user interface device 520 receives an input for selecting installation start 1020 of the second app, the image forming device 10 may download the second app from the server 20 and install the second app.

FIG. 11 is a view for explaining recommendation information provided in an image forming device according to a function provided in the image forming device, according to an example.

Referring to FIG. 11, the server 20 may generate a grouped whitelist of apps installed in the image forming device 10 and operating smoothly (e.g., without errors) for each image forming device 10, based on usage pattern data corresponding to usage patterns of apps. Furthermore, the server 20 may generate a grouped blacklist of apps installed in the image forming device 10 and operating poorly (e.g., causing an error) for each image forming device 10, based on the usage pattern data corresponding to the usage patterns of the apps. The server 20 may generate the whitelist and the blacklist for each function provided in the image forming device 10. The server 20 may transmit the generated whitelist and the blacklist to the image forming device 10. The user interface device 520 of the image forming device 10 may display the whitelist and the blacklist for each function provided in the image forming device 10 by category.

As shown in FIG. 11, the user interface device 520 may display a whitelist 1120 and a blacklist 1130 related to a scan function 1110 of the image forming device 10.

FIG. 12 is a flowchart for explaining an operation of a server, according to an example.

Referring to FIG. 12, the server 20 may receive usage data including usage information of apps executed in the image forming device 10 from the image forming device 10 in operation 1210. For example, the usage information of the apps may be information of apps used by each user logged in to the image forming device 10. In more detail, the usage information of the apps may include, but is not limited to, information of a frequently used function in each app, information of an execution order of apps used when a plurality of image forming operations are successively performed, or the like.

In addition, the server 20 may receive a plurality of pieces of usage data including usage information of apps executed in each image forming device 10 from a plurality of image forming devices 10.

In operation 1220, the server 20 may analyze usage patterns of the apps based on the usage data and store usage pattern data corresponding to the usage patterns in a storage of the server 20.

For example, the server 20 may obtain a pattern that is changed among execution screens output as the apps are executed in the image forming device 10 from the usage data. The server 20 may analyze the usage patterns of the apps based on the changing pattern among the execution screens. In more detail, the server 20 may obtain a pattern of at least one of a sequence among execution screens of a first app executed in the image forming device 10, a setting of a predetermined function of the first app, a work flow among the plurality of apps, or the like and may analyze the usage patterns of the apps. The server 20 may store usage pattern data corresponding to the analyzed usage patterns in the storage of the server 20.

As another example, the server 20 may obtain usage frequency information, from usage data, including usage frequency of apps for each user or usage frequency of functions used in the apps. The server 20 may analyze the usage patterns of the apps for each user based on the usage frequency information for each user.

In addition, the server 20 may generate reference data corresponding to each of the usage patterns of the apps based on a plurality of pieces of usage data received from the plurality of image forming devices 10 and may store the generated reference data in the storage of the server 20.

In operation 1230, the server 20 may receive first data corresponding to a first event from the image forming device 10. Here, the first event may include, but is not limited to, an attempt to execute a print function, an attempt to execute a copy function, an attempt to execute a scan function, an attempt to execute a fax transmission, an attempt to execute a work flow combining at least two functions, or the like.

In operation 1240, the server 20 may generate recommendation information related to an app performing an image forming operation corresponding to the first event based on the usage pattern data and the first data.

In more detail, the server 20 may determine a first usage pattern corresponding to the first event among the usage patterns of the apps based on the first data. The server 20 may generate recommendation information related to at least one app that performs an image forming operation according to the first usage pattern.

For example, the server 20 may generate a first app list including at least one app that performs an image forming operation corresponding to the first event based on the usage pattern data and the first data.

As another example, the server 20 may generate first app data, which is used to perform an image forming operation, based on the usage pattern data and the first data. In more detail, the server 20 may generate app data in which a function of the first app that performs the image forming operation corresponding to the first event is programmed. Also, the server 20 may generate app data in which a work flow among the plurality of apps performing a plurality of image forming operations corresponding to the first event is programmed.

Furthermore, the server 20 may generate recommendation information related to the app performing an image forming operation corresponding to the first event based on a result of comparing pieces of reference data corresponding to usage patterns of respective apps with each other.

In operation 1250, the server 20 may transmit the recommendation information to the image forming device 10. The server 20 may receive an input from the image forming device 10 to select first recommendation information among the recommendation information. The server 20 may retrieve the storage for an app or app data corresponding to the first recommendation information based on the input to select the first recommendation information and may transmit the retrieved app or app data to the image forming device 10.

For example, the server 20 may receive an input to select the first app from a first app list. The server 20 may retrieve an installation file of the first app from the storage and transmit the installation file to the image forming device 10.

FIG. 13 is a flowchart for explaining an operation of an image forming device, according to an example.

Referring to FIG. 13, the image forming device 10 may collect usage data including usage information of apps executed in the image forming device 10 from the image forming device 10 in operation 1310. The image forming device 10 may transmit the collected usage data to the server 20.

In operation 1320, the image forming device 10 may analyze usage patterns of the apps based on the usage data and store usage pattern data corresponding to the usage patterns in a memory of the image forming device 10. Furthermore, the image forming device 10 may transmit the usage pattern data to the server 20.

The image forming device 10 may obtain, based on the usage data, a pattern for at least one of a sequence among execution screens of the first app executed in the image forming device 10, a setting of a predetermined function of the first app, a work flow among the plurality of apps, or the like. The image forming device 10 may store the usage pattern data corresponding to the obtained pattern in the memory.

In addition, the image forming device 10 may obtain usage frequency information of apps for each user logged in to the image forming device 10. The image forming device 10 may store usage pattern data corresponding to the usage frequency information of apps for each user in the memory.

In operation 1330, the image forming device 10 may detect a first event in the image forming device 10.

In operation 1340, the image forming device 10 may obtain recommendation information related to an app performing an image forming operation corresponding to a first event based on the usage pattern data and the first data corresponding to the first event. For example, the recommendation information may be a first app list including at least one app that performs an image forming operation corresponding to the first event based on the usage pattern data and the first data. In addition, the recommendation information may be first app data, which is used to perform an image forming operation, based on the usage pattern data and the first data.

The image forming device 10 may directly generate the recommendation information based on the usage pattern data and the first data stored in the image forming device 10.

The image forming device 10 may also transmit the first data corresponding to the first event to the server 20 and receive the generated recommendation information from the server 20. Here, the recommendation information may be information obtained based on a result of comparing the first data with reference data corresponding to a usage pattern of each of apps stored in the server 20.

In operation 1350, the image forming device 10 may display the recommendation information on the user interface device 520 of the image forming device 10. The user interface device 520 of the image forming device 10 may receive an input for selecting first recommendation information from the recommendation information. The image forming device 10 may transmit the input for selecting the first recommendation information to the server 20.

In operation 1360, the image forming device 10 may receive an app or app data corresponding to the first recommendation information from the server 20. The image forming device 10 may install the received app or app data in the image forming device 10.

The examples of the present disclosure can be written as computer programs and can be implemented in general-use digital computers that execute the programs using a non-transitory computer-readable recording medium. In addition, a data structure used in the examples of the present disclosure can be written in a non-transitory computer-readable recording medium through various means. The one or more examples may be embodied as computer readable code/instructions on a recording medium, e.g., a program module to be executed in computers, which include computer-readable commands. For example, methods that are implemented as software modules or algorithms may be stored as computer readable code or program instructions executable on a non-transitory computer-readable recording medium.

The non-transitory computer-readable recording medium may include any usable medium that may be accessed by computers, volatile and non-volatile medium, and detachable and non-detachable medium. Examples of the non-transitory computer-readable recording medium include, but are not limited to, magnetic storage media (e.g., ROM, floppy disks, hard disks, etc.), optical recording media (e.g., CD-ROMs, or DVDs), etc. Also, the non-transitory computer-readable recording medium may include a computer storage medium and a communication medium.

The non-transitory computer-readable recording media can be distributed over network-coupled computer systems, and data stored in the distributed recording media, e.g., a program command and code, may be executed by using at least one computer.

Although the examples have been described with reference to the accompanying drawings, those of ordinary skill in the art will understand that various changes and modifications may be made therein. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, the scope of the present disclosure should be defined not by the described examples alone, but by the appended claims and the equivalents thereof.

The invention claimed is:

1. A server comprising:
a communication device to communicate with an image forming device;
a storage;
a processor; and
a memory to store instructions executable by the processor,
wherein the processor executes the instructions to:
receive, from the image forming device through the communication device, usage data comprising usage information of apps executed in the image forming device,
analyze usage patterns of the apps based on the usage data and store usage pattern data corresponding to the usage patterns in the storage, receive first data corresponding to a first event from the image forming device through the communication device,
generate recommendation information related to an app performing an image forming operation corresponding to the first event, based on the usage pattern data and the first data, and
transmit the recommendation information to the image forming device through the communication device.

2. The server of claim 1, wherein the processor further executes the instructions to:
obtain, from the usage data, a pattern that is changed among execution screens output when at least one app is executed in the image forming device; and
analyze a usage pattern of the at least one app based on the changing pattern among the execution screens.

3. The server of claim 1, wherein the processor further executes the instructions to:
store usage pattern data corresponding to at least one of a sequence among execution screens of a first app executed in the image forming device, a setting of a predetermined function of the first app, or a work flow among a plurality of apps in the storage.

4. The server of claim 1,
wherein the usage information of the apps comprises usage information of the apps for each user logged in to the image forming device, and
wherein the processor further executes the instructions to:
obtain usage frequency information, from the usage data, comprising a usage frequency of the apps for each user or usage frequency of functions used in the apps; and
analyze usage patterns of the apps for each user based on the usage frequency information for each user.

5. The server of claim 1, wherein the processor further executes the instructions to:
determine a first usage pattern corresponding to the first event among the usage patterns of the apps based on the first data; and
generate the recommendation information related to at least one app that performs the image forming operation according to the first usage pattern.

6. The server of claim 1, wherein the processor further executes the instructions to:
generate a first app list comprising at least one app that performs the image forming operation corresponding to the first event based on the usage pattern data and the first data; and
generate first app data, which is used to perform the image forming operation, based on the usage pattern data and the first data.

7. The server of claim 6, wherein the processor further executes the instructions to:
generate app data in which a function of a first app that performs the image forming operation corresponding to the first event is programmed; and
generate app data in which a work flow among a plurality of apps performing a plurality of image forming operations corresponding to the first event is programmed.

8. The server of claim 1, wherein the processor further executes the instructions to:
receive, from a plurality of image forming devices, through the communication device, a plurality of pieces of usage data comprising usage information of the apps executed in each of the image forming devices; and
generate reference data corresponding to each of the usage patterns of the apps, based on the plurality of pieces of usage data and store the generated reference data in the storage.

9. The server of claim 8, wherein the processor further executes the instructions to:
generate the recommendation information related to the app performing the image forming operation corresponding to the first event, based on a result of comparing the first data with reference data.

10. An operating method of a server, the operating method comprising:
receiving, from an image forming device, usage data comprising usage information of apps executed in the image forming device;
analyzing usage patterns of the apps based on the usage data and storing usage pattern data corresponding to the usage patterns;
receiving first data corresponding to a first event from the image forming device;
generating recommendation information related to an app performing an image forming operation corresponding to the first event, based on the usage pattern data and the first data; and
transmitting the recommendation information to the image forming device.

11. An image forming device comprising:
a communication device to communicate with a server;
a processor;
a memory to store instructions executable by the processor; and
a user interface device to receive a user input and display information related to the image forming device,
wherein the processor executes the instructions to:
collect usage data comprising usage information of apps executed in the image forming device;
analyze usage patterns of the apps based on the usage data and store usage pattern data corresponding to the usage patterns in the memory;
detect a first event in the image forming device;
obtain recommendation information related to an app performing an image forming operation corresponding to the first event based on the usage pattern data and first data corresponding to the first event; and
control the recommendation information to be displayed on the user interface device.

12. The image forming device of claim 11, wherein the processor further executes the instructions to:
transmit the usage pattern data to the server;
transmit the first data corresponding to the first event to the server; and
receive, from the server, the recommendation information obtained based on a result of comparing the first data with reference data corresponding to a usage pattern of each of the apps stored in the server.

13. The image forming device of claim 11, wherein the processor further executes the instructions to:
obtain a first app list comprising at least one app that performs the image forming operation corresponding to the first event based on the usage pattern data and the first data; and
obtain first app data, which is used to perform the image forming operation, based on the usage pattern data and the first data.

14. The image forming device of claim 11, wherein the processor further executes the instructions to:
receive an input to select first recommendation information among the recommendation information through the user interface device, and
transmit the input to the server through the communication device; and
receive an app or app data corresponding to the first recommendation information from the server through the communication device and install the received app or app data in the image forming device.

15. The image forming device of claim 11, wherein the processor further executes the instructions to:
obtain usage pattern data corresponding to at least one of a sequence among execution screens of a first app executed in the image forming device, a setting of a predetermined function of the first app, or a work flow among the plurality of apps;
obtain usage pattern data corresponding to usage frequency information of the apps for each user logged in to the image forming device; and
store the usage pattern data obtained by the at least one operation in the memory.

* * * * *